(12) United States Patent
Pividori et al.

(10) Patent No.: US 7,448,260 B2
(45) Date of Patent: Nov. 11, 2008

(54) FUEL CONSUMPTION METER FOR INTERNAL COMBUSTION ENGINES AND METHOD

(76) Inventors: Marcelo Roberto Pividori, Calle 2 No. 53, Avellaneda, Provincia de Santa Fe (AR) 3561; Luis Armando Santucho, Calle 2 No. 53, Avellaneda, Provincia de Santa Fe (AR) 3561; Abel Zechin, Calle 2 No. 53, Avellaneda, Provincia de Santa Fe (AR) 3561

( * ) Notice: Subject to any disclaimer, the term of this patent is extended or adjusted under 35 U.S.C. 154(b) by 31 days.

(21) Appl. No.: 11/699,180

(22) Filed: Jan. 29, 2007

(65) Prior Publication Data
US 2007/0175271 A1  Aug. 2, 2007

(30) Foreign Application Priority Data
Feb. 1, 2006  (AR) .............................. P060110357

(51) Int. Cl.
*G01F 9/00* (2006.01)

(52) U.S. Cl. .................................. 73/114.52

(58) Field of Classification Search ............. 73/114.38, 73/114.41, 114.42, 114.45, 114.48, 114.52, 73/114.53, 114.54
See application file for complete search history.

(56) References Cited

U.S. PATENT DOCUMENTS

| 5,284,120 | A  | * | 2/1994  | Fukushima et al. | 123/510   |
|-----------|----|---|---------|------------------|-----------|
| 6,301,958 | B1 | * | 10/2001 | Grabher et al.   | 73/114.54 |
| 2004/0163459 | A1 | * | 8/2004  | Christian et al. | 73/199 |
| 2004/0211263 | A1 | * | 10/2004 | Wiesinger et al. | 73/716 |
| 2006/0277982 | A1 | * | 12/2006 | Christian et al. | 73/112 |

* cited by examiner

*Primary Examiner*—Eric S McCall
(74) *Attorney, Agent, or Firm*—Day Pitney LLP

(57) ABSTRACT

A device and method for measuring the consumption of fuel in an internal combustion engine system having fuel injectors, the device comprising a main body having two flow-measuring chambers with each chamber including a flow meter wherein one flow meter is located upstream the injectors and another flow meter is located downstream the injectors for calculating the difference between the flow upstream the injectors and downstream the injectors, and whereby the difference is fed to a data processing unit to calculate the real fuel consumption.

10 Claims, 5 Drawing Sheets

FUEL CONSUMPTION METER FOR INTERNAL COMBUSTION ENGINES AND METHOD

BACKGROUND OF THE INVENTION

1. Field of the Invention

The present invention relates to a new device for controlling or sensing consumption of fuel in internal combustion engines, preferably in diesel engines, wherein the device is able to operate autonomously and to measure the real consumption by considering not only the fuel fed to the fuel injectors but also the exceeding fuel that is returned back to the fuel tank, this measuring being also adjusted by the temperature of fuel. The invention also provides a method fro measuring the fuel consumption in internal combustion engines.

2. Description of the Prior Art

Control or measuring of fuel consumption during the running or operation of the engine is something that car manufacturers have pursued because this parameter, fuel consumption, has become of very importance in the daily use of a vehicle, either a familiar one or a commercial truck, etc. In commercial transportation, the fuel consumption is a parameter importantly involved in the operation costs of the business.

There are well known measuring systems employing a fuel flow meter installed in a fuel line before the fuel inlet to the engine such as the fuel injectors. In diesel engines, however, this way of measuring the consumption leads to erroneous figures because there are some variables that are not taken into account to calculate a real consumption figure. For example, the amount of fuel fed to the fuel injectors are not entirely consumed because only part of the fuel passing through the injectors are injected into the combustion chamber, namely the cylinder of the engine, while other part continues circulating out of the injectors via a return line back to the fuel tank of the engine system.

Under the above circumstances, some installers or mechanics close, remove or by-pass the fuel return coming from the injectors to the fuel tank in order to attempt to get correct measures. One of the drawbacks of making a by-pass in the fuel return is that the conditions of operation of the fuel pump is altered and the pressure is modified in the return circuit. This is an important drawback because the return line passes trough a return valve that controls and guarantees the correct pressure in the injection chamber of the pump with undesired results in the engine operation.

In addition to the foregoing, if the return line is closed, one of the functions of this return, namely the refrigeration of the injection system, is cancelled with the consequent premature deterioration of the system. An additional drawback is that the return line also actuates to keep the injection pump free of fuel vapour bubbles generated into the injection chamber, wherein the return line brings and conducts the bubbles into the fuel tank. Finally, some is the known sensors, employed in conventional fuel flow meters, are not capable of adjusting detected values according to variables involved in the system as well as these sensors always require of a display for analysis and view of the required information.

Considering the above, it would be very important to have a new device or system for calculating the correct fuel consumption of an engine without altering the operation conditions of the engine, without requiring of complex installations, with autonomous operation, with no requirements of displays for information, and capable of storing information in a sensor to be accessible when requested.

SUMMARY OF THE INVENTION

It is therefore an object of the invention to provide a device for measuring the consumption of fuel in an internal combustion engine system wherein the device is installed to measure the fuel entering the engine and the fuel exiting the engine, whereby the calculation of the correct real fuel consumption is made by calculating the difference between the fuel entering the engine and the fuel exiting the engine, with the calculation being also corrected or adjusted by other parameters sensed in the system, such as the temperature and flowing characteristics of the fuel.

It is still another object of the present invention to provide a device and method for measuring the consumption of fuel in an internal combustion engine system having fuel injectors, the device comprising a main body having two flow-measuring chambers with each chamber including a flow meter wherein one flow meter is located upstream the injectors and another flow meter is located downstream the injectors for calculating the difference between the flow upstream the injectors and downstream the injectors, and whereby the difference is fed to a data processing unit to calculate the real fuel consumption.

It is a further object of the present invention to provide a device for measuring the consumption of fuel in an internal combustion engine system, the engine system having a plurality of fuel injectors for injecting fuel into an internal combustion engine, a fuel tank containing fuel for feeding the engine, a transfer pump for transferring fuel from the tank into an injection pump for feeding the injectors, and a fuel return line for conducting exceeding fuel from the fuel injectors back to the fuel tank, and a power source for providing energy to the device, whereby the device is autonomous, the device comprising:

a main body defining a first and a second lobe-shaped flow-measuring chambers;

a first flow meter in said first lobe-shaped flow-measuring chamber and second flow-meter in said second lobe-shaped flow-measuring chamber, wherein the first flow meter comprises a pair of first lobe-shaped rotors rotatably mounted within the first flow-measuring chamber and the second flow meter comprises a pair of second lobe-shaped rotors rotatably mounted within the second flow-measuring chamber, the first flow-measuring chamber having a fuel inlet port and a fuel outlet port connected between the fuel tank and the injection pump and the second flow-measuring chamber having a fuel inlet port connected to the fuel return line, and a fuel outlet port connected to the fuel tank, and at least one first sensor for detecting the rotation of the first lobe-shaped rotors, at least one second sensor for detecting the rotation of the second lobe-shaped rotors, and wherein said sensors for detecting the rotation of the lobe-shaped rotors are preferably part of a data processing unit for calculating any difference between the rotation detected for the first lobe-shaped rotors and the rotation detected for the second lobe-shaped rotors.

It is a further object of the present invention to provide a method for measuring the fuel consumption of an engine by employing the device of the invention, wherein the method comprises the steps of:

providing said first flow-meter in a fuel line extending between the transfer pump and the injection pump, measuring the rotation of the first flow meter, providing said second flow-meter in the fuel return line between the injectors and the fuel tank, measuring the rotation of the second flow meter,
calculating the difference between the calculated rotation of the first flow meter and the calculated rotation of the second flow meter to obtain a calculated rotation difference,
measuring the temperature of the fuel passing through the flow meters, and
adjusting the calculated rotation difference by affecting the same by the measured temperature.

The above and other objects, features and advantages of this invention will be better understood when taken in connection with the accompanying drawings and description.

BRIEF DESCRIPTION OF THE DRAWINGS

The present invention is illustrated by way of example in the following drawings wherein.

DESCRIPTION OF THE PREFERRED EMBODIMENTS

Figure 1:
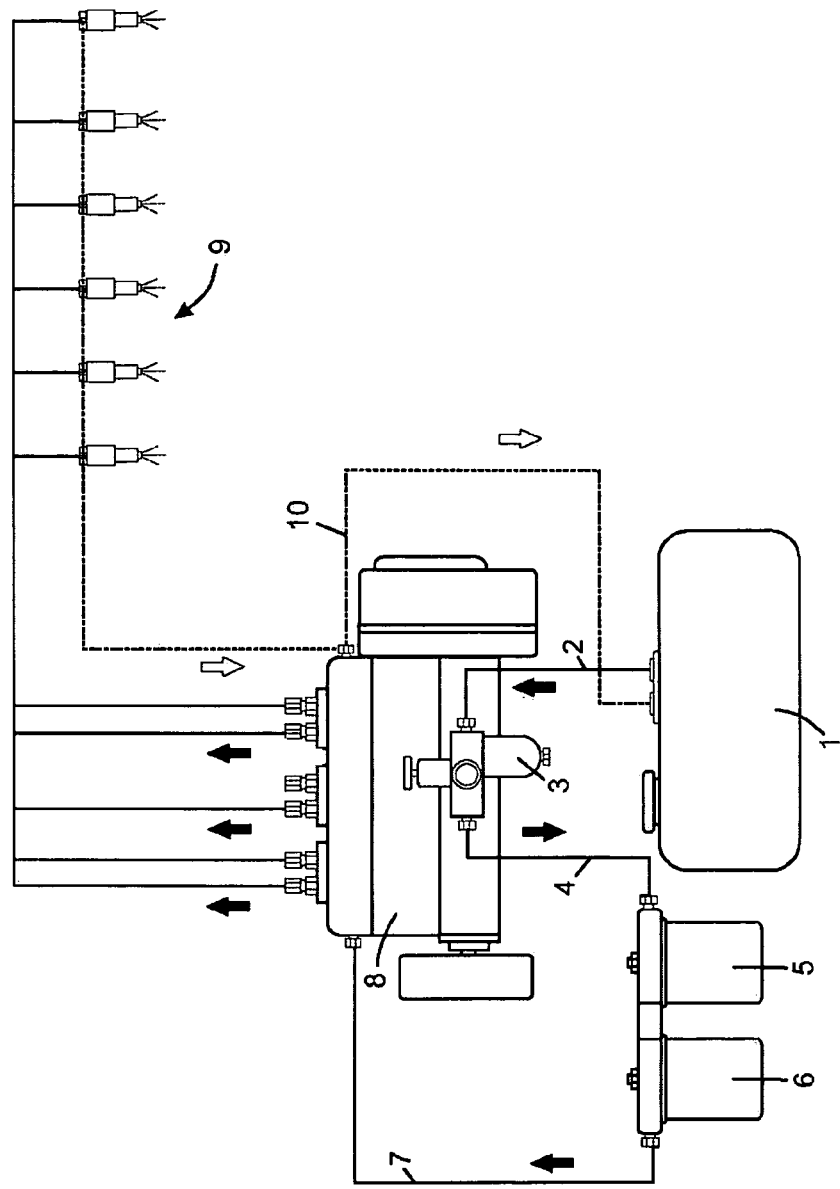
FIG. 1 shows a schematic diagram of a conventional diesel engine system.

Now referring in detail to the invention, the same refers to a device for measuring the consumption of fuel in an internal combustion engine system. According to a preferred application of the invention, the device will be disclosed in connection to a diesel engine system, therefore reference will be made now to a conventional engine system, shown in FIG. 1. The engine system has a fuel tank 1, for containing the fuel for feeding the internal combustion engine, not shown, connected via a line 2 to a transfer pump 3 which is in charge of sending the fuel, via a line 4 and through a filter 5, 6, via a line 7 into an injection pump 8. Injection pump 8 feeds the fuel to a plurality of injectors 9, with each injector connected to each cylinder in the engine block, not shown, as it is well known in the art.

As it is also known in the art, not all the fuel fed by injection pump 8 to injectors 9 are injected into the engine cylinders, therefore, for all the fuel exceeding the necessary injection, a return line 10 is provided, extending from the injectors for returning the exceeding fuel back to fuel tank 1. As explained above, this return line is removed, by-passed or closed by the conventional fuel flow meters. In all the Figures, black arrows indicate circulation of feeding fuel towards injectors and white arrows indicate returning fuel from the injectors.

Figure 2:
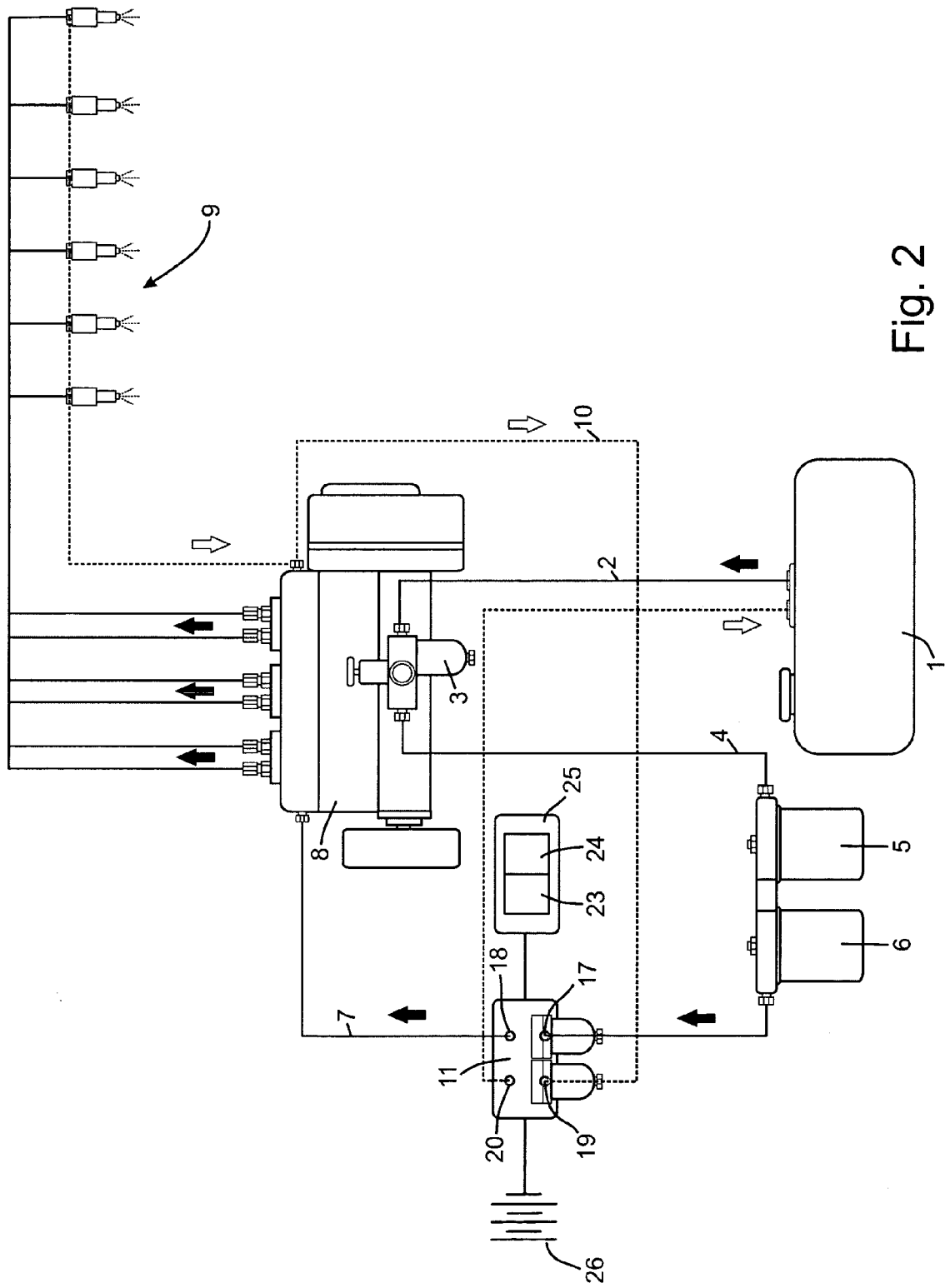
FIG. 2 shows a schematic diagram of a diesel engine system having the device of the invention installed with a flow chamber connected between the transfer pump and the injection pump and the other flow chamber connected between the return line and the fuel tank.

According to the invention, the return line not only is not closed or by-passed but it is taken into consideration for measuring purposes. The device of the invention, indicated by reference 11 may be installed, as shown in FIG. 2, with a flow measuring chamber connected in line 7, between filter 5, 6 and injection pump 8, and the other flow measuring chamber connected in line 10, between injectors 8 and fuel tank 1.

Figure 3:
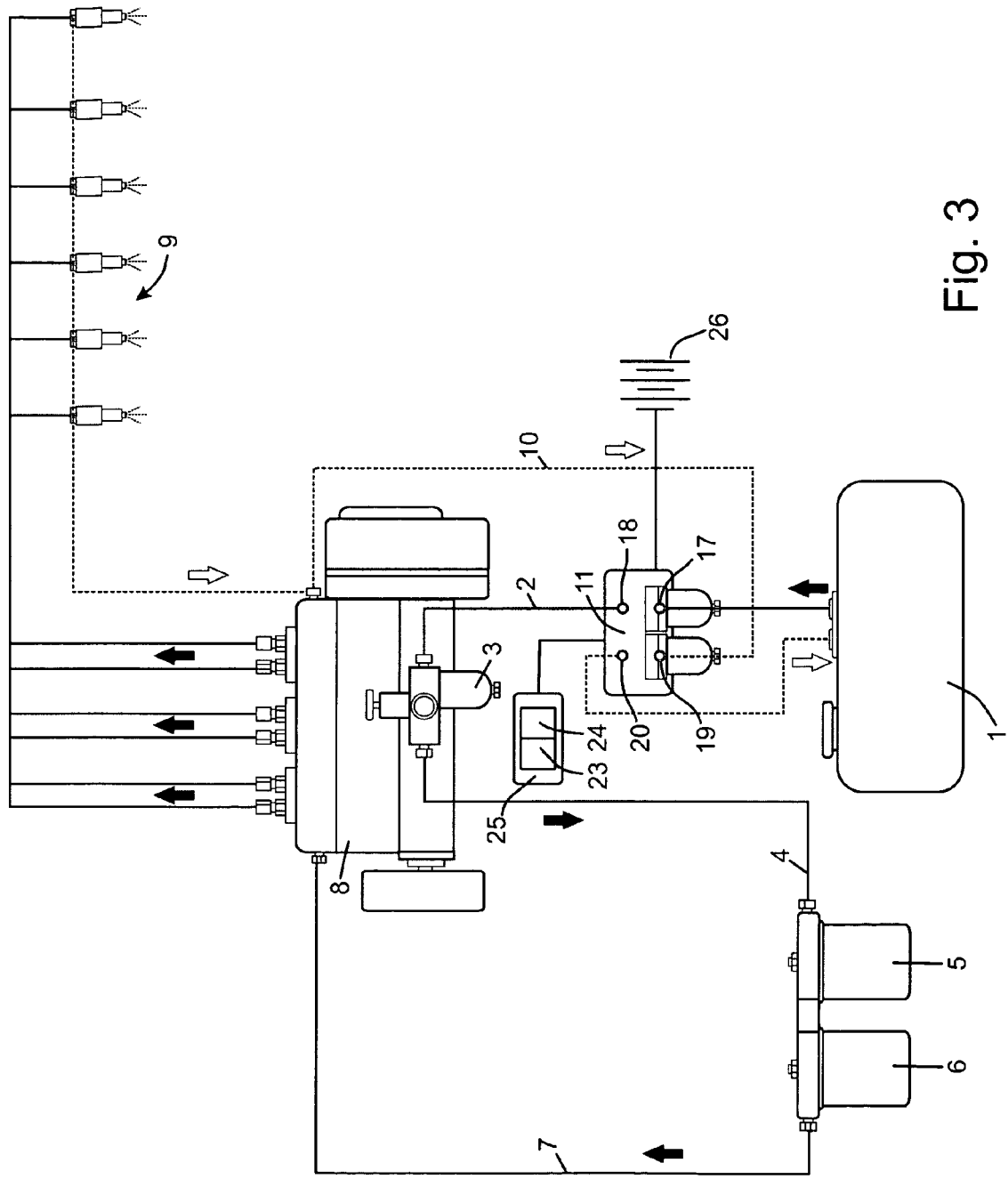
FIG. 3 shows a schematic diagram of an alternative diesel engine system having the device of the invention installed with a flow chamber connected between the fuel tank and the transfer pump and the other flow chamber connected between the return line and the fuel tank.

Alternatively, device 11 may be installed, as shown in FIG. 3, with a flow measuring chamber connected in line 2, between fuel tank 1 and transfer pump 3, and the other flow measuring chamber connected in line 10, between injectors 8 and fuel tank 1.

Figure 4:
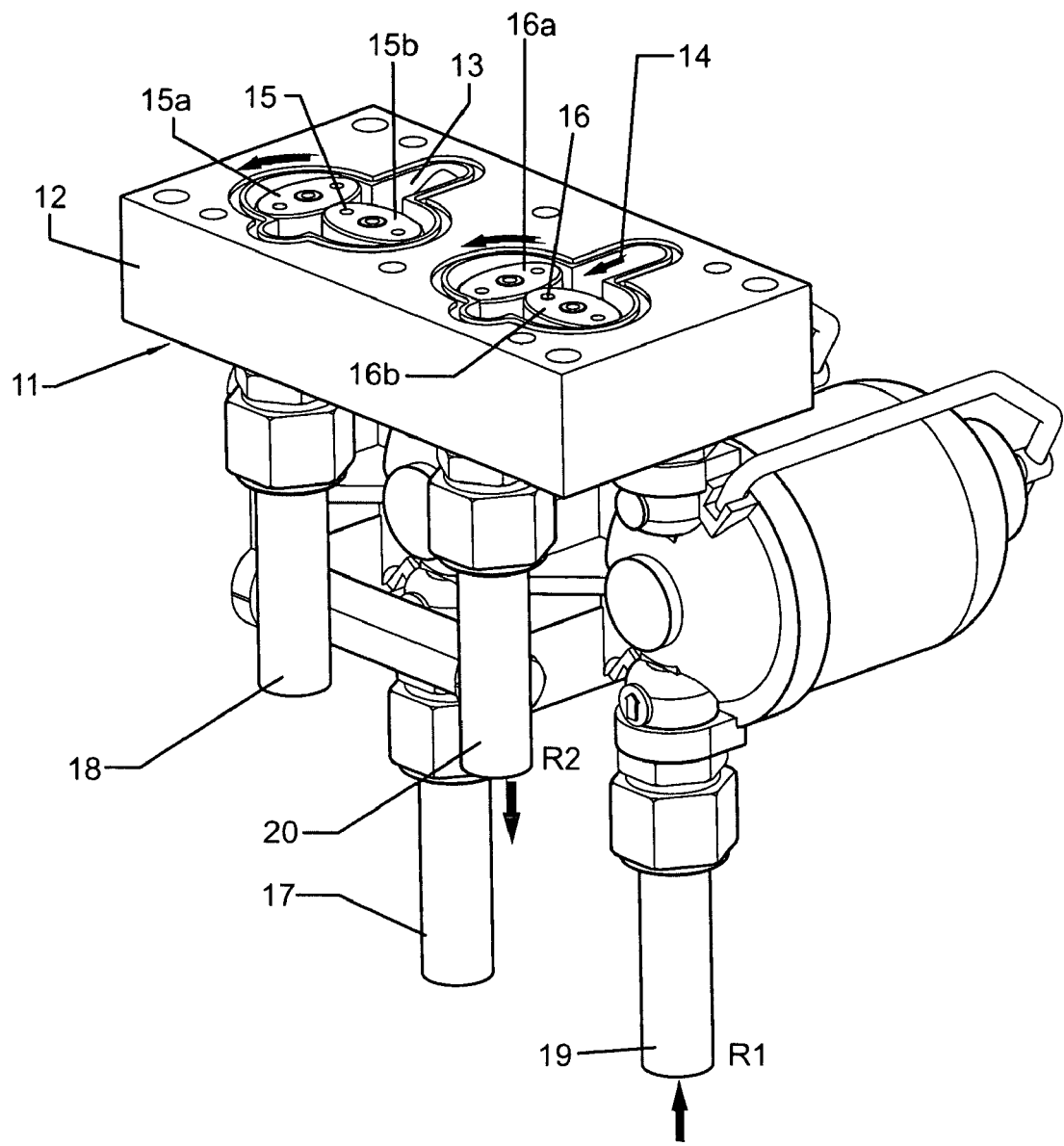
FIG. 4 shows a perspective view of the device according to the invention, with an upper cap remove to see the flow chambers and their corresponding flow meters.
Figure 5:
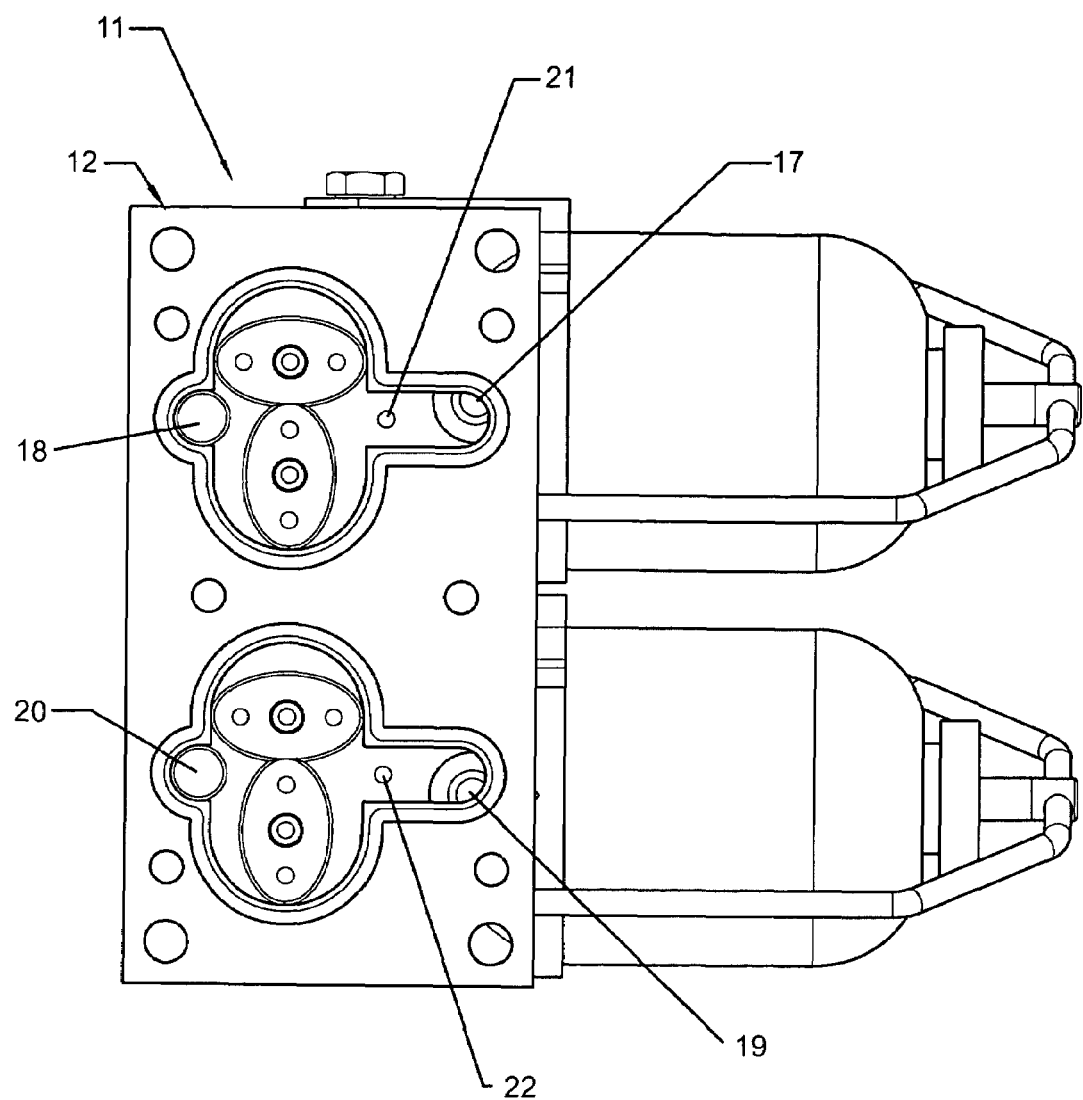
FIG. 5 shows a plant view of the device of FIG. 4, also with the cap removed to see the interior of the device.

As clearly illustrated in FIGS. 4 and 5, device 11 comprises a main body or mounting block 12, preferably made of only one piece of resin, aluminum, and the like, and defining a first 13 and a second 14 lobe-shaped flow-measuring chambers. A first flow meter 15 is mounted in said first lobe-shaped flow-measuring chamber 13 and second flow-meter 16 is arranged in said second lobe-shaped flow-measuring chamber 14. Each flow meter comprises a pair of rotors connected and mounted to rotate into the corresponding chamber.

More particularly, first flow meter 15 comprises a pair of first lobe-shaped rotors 15a, 15b, that are rotatably mounted within first flow-measuring chamber 13 and second flow meter 16 comprises a pair of second lobe-shaped rotors 16a, 16b that are rotatably mounted within the second flow-measuring chamber 14. Each rotor 15a, 15b and 16a, 16b, as better shown in FIGS. 4 and 5, comprises an oval piece having a toothed periphery whereby the two lobe-shaped rotors 15a-15b and 16a-16b, within the corresponding flow measuring chamber, are coupled together through their corresponding toothed peripheries.

In the embodiment of FIG. 2, first flow-measuring chamber 13 is provided with a fuel inlet port 17 connected to the transfer pump 3, via filter 5, 6, and a fuel outlet port 18 connected to injection pump 8. Second flow-measuring chamber 14 is also provided with a fuel inlet port 19 connected to fuel return line 10, and a fuel outlet port 20 connected to fuel tank 1.

In the embodiment of FIG. 3, fuel inlet port 17 is connected to fuel tank 1 and fuel outlet port 18 is connected to transfer pump 3, as well as fuel inlet port 19 is connected to fuel return line 10, and fuel outlet port 20 is connected to fuel tank 1.

In both embodiments of FIGS. 2 and 3, the fuel enters fuel inlet port 17, passes through chamber 13, makes rotors 15a, 15b rotate and exits through fuel outlet exit 18. In like manner fuel enters fuel inlet port 19, passes through chamber 14, makes rotors 16a, 16b rotate and exits through fuel outlet exit 20. As explained above, rotors 15a-15b nd 16a-16b rotate together because they are coupled through their toothed periphery.

The rotation speed of rotors 15a, 15b, 16a, 16b, will depend on the flow of the fuel passing through flow measuring chambers 13 and 14, therefore if the rotation of the rotors can be sensed in any manner this rotation will provide the information for calculating the flow of fuel passing through the flow meters. For example, the rotation of the rotors may be sensed by means of at least one first sensor for detecting the rotation of the first lobe-shaped rotors, and at least one second sensor for detecting the rotation of the second lobe-shaped rotors.

The at least one first sensor for detecting the rotation of the first rotors, and at least one second sensor for detecting the rotation of the second rotors are schematically indicated by blocks 23, 24. Sensors 23, 24 may be included or may form part of a data processing unit generally indicated by reference 25 also in a block shape. The information sensed by sensors 23, 24 may be processed by unit 25 for calculating any difference between the rotation detected for the first lobe-shaped rotors and the rotation detected for the second lobe-shaped rotors. Wile unit 15 and sensors 23, 24 are illustrated as being connected to device 11, it is preferred that sensors 23, 24 comprise magnetic sensors which do not need to be in contact or connected to the lobe-shaped rotors.

In addition, each chamber 13, 14 is provided with a temperature meter or sensor 21, 22 in order that the temperature of the fuel going to the injection pump and the fuel coming from the injectors may be sensed. The information about the rotation of rotors 15a-15b and 16a-16b, as well as the temperature values in both chambers 13, 14, which information is independent for each of the chambers, is fed to processing unit 25 which can calculate locally and in real time the real amount of consumed fuel by first calculating the difference between the rotation of rotors 15a, 15b, and the rotation of rotors 16a, 16b, which difference is also affected by adjustments due to temperatures taken at chambers 13,14 as well as due to flow characteristics of the fuel, such as density, fluency, etc. For example, the fluidity is calculated on the basis of changes in density of the fuel due to temperature.

The installation may have only three conductors and the information may be stored in a memory for, for example, calculating the total consumed fuel, tracking, events, etc. Through such three conductors the system is energized from a power source, for example a battery 26, or any other power source, whereby the device may operate as an autonomous equipment.

Also according to the invention, a method is provided for measuring the fuel consumption in real time of an engine, preferably a diesel engine, by employing the above disclosed device of the invention. The method comprises the steps of:

providing said first flow-meter in a fuel line extending between the fuel tank and the injection pump in order to sense the flow of fuel going from the tank to the injection pump, measuring the rotation of the first flow meter in order to get the information about the flow of the fuel passing towards the injection pump, providing said second flow-meter in the fuel return line between the injectors and the fuel tank, in order to sense the flow of fuel returning from the injectors to the tank, measuring the rotation of the second flow meter in order to get the information about the flow of the fuel not consumed and returning to the tank, calculating the difference between the calculated rotation of the first flow meter and the calculated rotation of the second flow meter to obtain a calculated rotation difference, measuring at least the temperature of the fuel passing through the flow meters, and adjusting the calculated rotation difference by affecting the same by the measured temperature. Other parameters, such as density and the like, may be also measured to adjust the final value of the consumption.

While preferred embodiments of the present invention have been illustrated and described, it will be obvious to those skilled in the art that various changes and modifications may be made therein without departing from the scope of the invention as defined in the appended claims.

We claim:

1. A device for measuring the consumption of fuel in an internal combustion engine system, the engine system having a plurality of fuel injectors for injecting fuel into an internal combustion engine, a fuel tank containing fuel for feeding the engine, a transfer pump for transferring fuel from the tank into an injection pump for feeding the injectors, and a fuel return line for conducting exceeding fuel from the fuel injectors back to the fuel tank, and a power source for providing energy to the device, whereby the device is autonomous, the device comprising:

a main body defining a first and a second lobe-shaped flow-measuring chambers;

a first flow meter in said first lobe-shaped flow-measuring chamber and second flow-meter in said second lobe-shaped flow-measuring chamber, wherein the first flow meter comprises a pair of first lobe-shaped rotors rotatably mounted within the first flow-measuring chamber and the second flow meter comprises a pair of second lobe-shaped rotors rotatably mounted within the second flow-measuring chamber, the first flow-measuring chamber having a fuel inlet port and a fuel outlet port connected between the fuel tank and the injection pump and the second flow-measuring chamber having a fuel inlet port connected to the fuel return line, and a fuel outlet port connected to the fuel tank, and at least one first sensor for detecting the rotation of the first lobe-shaped rotors, at least one second sensor for detecting the rotation of the second lobe-shaped rotors.

2. The device of claim 1, wherein said sensors for detecting the rotation of the lobe-shaped rotors are part of a data processing unit for calculating any difference between the rotation detected for the first lobe-shaped rotors and the rotation detected for the second lobe-shaped rotors.

3. The device of claim 2, wherein fuel inlet port of the first flow-measuring chamber is connected to the transfer pump, and the fuel outlet port of the first flow-measuring chamber is connected to the injector pump.

4. The device of claim 2, wherein fuel inlet port of the first flow-measuring chamber is connected to the fuel tank, and the fuel outlet port of the first flow-measuring chamber is connected to the transfer pump.

5. The device of claim 2, wherein each flow-measuring chamber includes a temperature meter for measuring the temperature of the fuel passing through the chamber.

6. The device of claim 2, wherein said sensors for detecting the rotation of the lobe-shaped rotors are magnetic sensors which are free of contact with the lobe-shaped rotors.

7. The device of claim 2, wherein each lobe-shaped rotor comprises an oval piece having a toothed periphery whereby the two lobe-shaped rotors in a flow measuring chamber are coupled to each other through their corresponding toothed peripheries.

8. The device of claim 2, wherein said body is a resin-made piece.

9. The device of claim 2, wherein said body is an aluminum-made piece.

10. A method for measuring the fuel consumption by employing the device of claim 1, the method comprising the steps of:

providing said first flow-meter in a fuel line extending between the fuel tank and the injection pump, measuring the rotation of the first flow meter, providing said second flow-meter in the fuel return line between the injectors and the fuel tank, measuring the rotation of the second flow meter, calculating the difference between the calculated rotation of the first flow meter and the calculated rotation of the second flow meter to obtain a calculated rotation difference, measuring the temperature of the fuel passing through the flow meters, and adjusting the calculated rotation difference by affecting the same by the measured temperature.

* * * * *